United States Patent [19]

Svendsen

[11] Patent Number: 5,332,012
[45] Date of Patent: Jul. 26, 1994

[54] DEVICE WITH A TELESCOPIC OR COLLAPSIBLE CHUTE FOR DELIVERING FLOWABLE BULK CARGO

[75] Inventor: Borge Svendsen, Herning, Denmark

[73] Assignee: Th. Rasmussen Molle - Og Maskinbyggeri A/S, Herning, Denmark

[21] Appl. No.: 974,593

[22] PCT Filed: Sep. 16, 1991

[86] PCT No.: PCT/DK91/00272

§ 371 Date: Feb. 22, 1993

§ 102(e) Date: Feb. 22, 1993

[87] PCT Pub. No.: WO92/05098

PCT Pub. Date: Apr. 2, 1992

[30] Foreign Application Priority Data

Sep. 17, 1990 [DK] Denmark ............... 2235/90

[51] Int. Cl.$^5$ .............................................. B65G 11/08
[52] U.S. Cl. .......................................... 141/93; 141/65; 141/286; 414/291
[58] Field of Search ............ 141/93, 59, 65, 286; 414/291, 299

[56] References Cited

U.S. PATENT DOCUMENTS

| | | | |
|---|---|---|---|
| 2,524,560 | 10/1950 | Cote | 141/93 X |
| 3,241,581 | 3/1966 | Richardson | 141/93 |
| 3,867,969 | 2/1975 | Garnett | 141/59 |
| 3,881,610 | 5/1975 | Hessling | 414/291 X |
| 3,883,011 | 5/1975 | Pennell | 414/291 |
| 4,052,108 | 10/1977 | Weaver et al. | 414/291 X |
| 4,061,221 | 12/1977 | Higashinaka et al. | 414/291 X |
| 4,182,591 | 1/1980 | Stanelle | 414/291 |
| 4,225,033 | 9/1980 | Fukagai et al. | 414/291 X |
| 4,340,136 | 7/1982 | Hanrot et al. | 141/93 |
| 4,492,294 | 1/1985 | Ball | 141/93 X |
| 4,557,364 | 12/1985 | Ball | 414/291 X |
| 4,699,187 | 10/1987 | Binzen | 141/93 X |
| 4,714,097 | 12/1987 | Binzen et al. | 141/93 X |
| 4,727,913 | 3/1988 | Bliss | 141/93 X |
| 4,821,861 | 4/1989 | Shanahan | 141/93 X |
| 4,969,494 | 11/1990 | Chefson | 141/93 |

FOREIGN PATENT DOCUMENTS

| | | | |
|---|---|---|---|
| 304020 | 2/1989 | European Pat. Off. | |
| 2313779 | 9/1974 | Fed. Rep. of Germany | |
| 3708653 | 9/1988 | Fed. Rep. of Germany | 141/93 |
| 2410618 | 6/1979 | France | |
| 2562525 | 10/1985 | France | |
| 0140356 | 10/1979 | Japan | 414/291 |
| 347934 | 8/1972 | Sweden | |

Primary Examiner—Ernest G. Cusick
Attorney, Agent, or Firm—Ladas & Parry

[57] ABSTRACT

Apparatus for delivering flowable bulk material such as grain, substantially free of dust into a receptacle, such as a vehicle, wherein the grain is delivered through a filter assembly to a chute which can be elongated and contracted and which has a lower end for connection to the vehicle. The filter assembly is also capable of assuming elongated and contracted states in order to confer a greater free height below the lower end of the chute. The filter assembly is formed with an outside filter housing capable of being elongated and contracted and within the filter housing is a suction chamber downstream of which, one or more filter bags are provided to separate dust from suctioned air. The filter bags can be constructed to prevent radial and longitudinal collapse thereof, as well as to undergo contraction when the chute and filter housing are contracted. An inlet pipe can be provided within the bag to convey the grain to the chute and in the contracted state the chute surrounds the inlet tube.

10 Claims, 1 Drawing Sheet

DEVICE WITH A TELESCOPIC OR COLLAPSIBLE CHUTE FOR DELIVERING FLOWABLE BULK CARGO

TECHNICAL FIELD

The present invention relates to a device for delivering flowable bulk cargo through a telescopic or collapsible chute.

BACKGROUND ART

Devices of this kind are used in many cases for delivering flowable bulk cargo e.g. grain, from the lower end of a container situated at a distance above a tank vehicle to be loaded with the bulk cargo.

During such loading of the tank vehicle with flowable bulk cargo, which as mentioned above may be grain, or sand, gravel, cement, flour, cocoa powder and other materials, rather great quantities of dust will usually be developed, this dust both being capable of constituting a health risk for the personel in question, and—in the case of combustible dust—a not inconsiderable risk of explosion.

For this reason, in order to prevent the dust from escaping during the loading operation, exhaust filter assemblies are placed at the lower end of the delivering container, the chute then having been moved downwardly to the lower end of the filter assembly. All filter assemblies having been proposed for this purpose up to now, examples of which are known from the documents Frame-A-2.562.525 and German-A-2.313.779, have been constructed with fixed dimensions, and thus by placing such a filter assembly between the lower end of the delivering container and the chute the available free height is reduced which is disadvantageous, particularly since it is desired to increase the size of the tank vehicles.

SUMMARY OF THE INVENTION

It is thereby an object of the present invention to provide such a device by which the available free height is substantially increased as compared to devices comprising a filter assembly with fixed dimensions. This object is achieved with a device, according to the present invention in which the filter assembly is telescopic or collapsible in the vertical direction.

BRIEF DESCRIPTION OF THE DRAWING

In the following specification, the present invention will be explained in more detail with reference to the drawing, in which FIG. 1 is a vertical longitudinal section through the device in an operational situation, while FIG. 2 shows the device in a collapsed position of rest.

DESCRIPTION OF THE PREFERRED EMBODIMENT

Figures 1, 2:
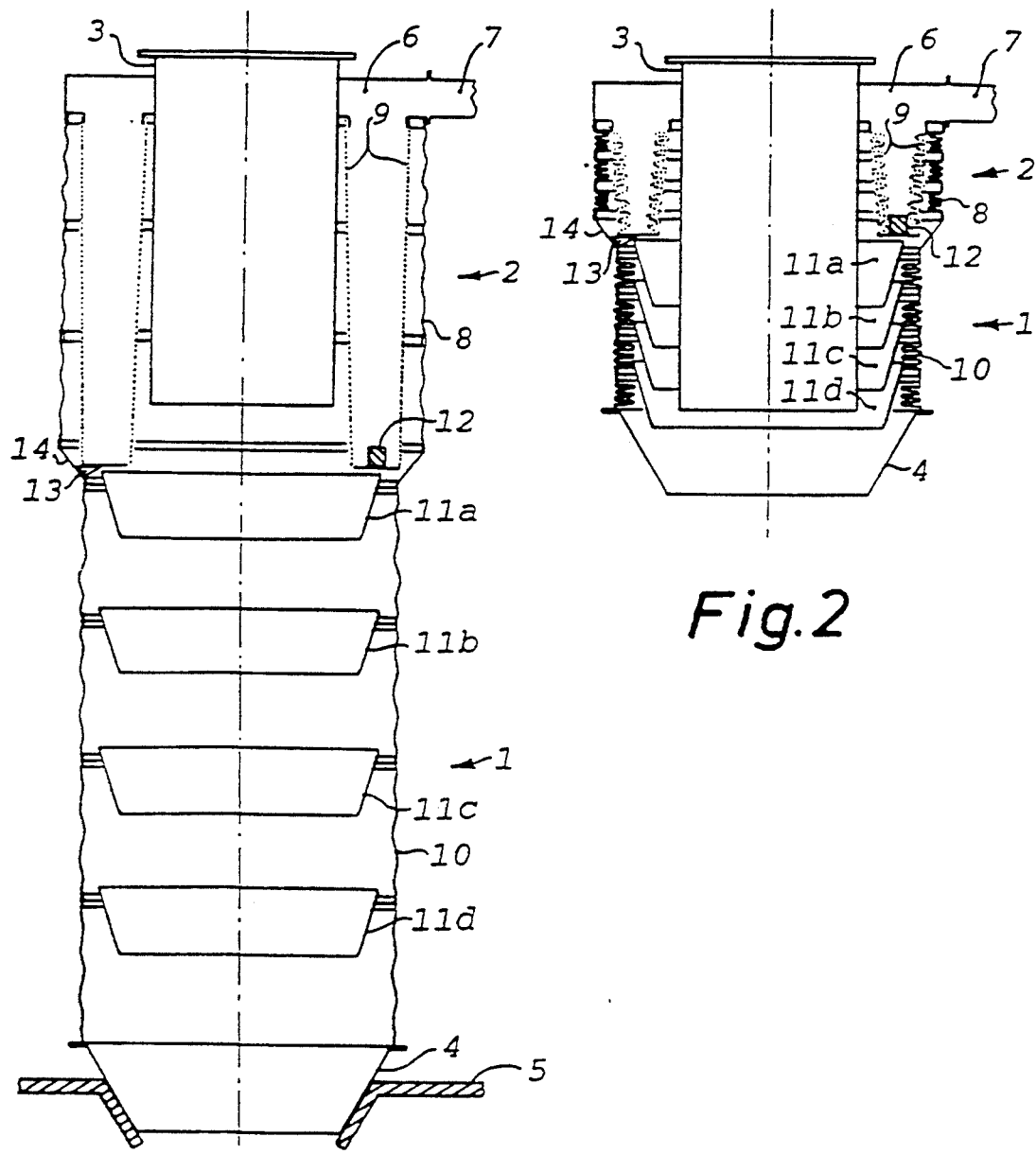

The device shown in the drawing for delivering flowable bulk cargo (not shown), e.g. grain, consists of two main components, viz.

a chute 1 which has elongated and contracted states in the vertical direction, and a filter assembly 2, likewise having elongated and contracted states in the vertical direction.

When in use, the device is placed at the lower end of the elongated and contracted states of the chute 1 and filter assembly 2 can be achieved by making chute 1 and filter assembly 2 "telescopic or collapsible" and hereafter this expression will be used to describe the configuration, a granary or a grain bin (not shown), so that an opening in the bottom of the granary or grain bin connects to the upper end of an inlet tube 3, the lower end of which opens in the chute 1. The lower end of the chute is formed with an outlet cone 4. The outlet cone 4 rests in an opening in a roof 5 of a tank vehicle (otherwise not shown) for transporting grain.

Thus, the filter assembly 2 and the chute 1 serve to guide the grain flowing from an outside source, such as a granary or grain bin (not shown) down into the tank vehicle, via the roof 5 thereof.

The filter assembly 2 is adapted to prevent escape of dust while the grain flows down through the filter assembly and the chute. To this end, the filter assembly 2 is constructed as an enclosure extending around the inlet tube 3 to form an inlet assembly above the chute 1, the lower end of the enclosure in the operating condition shown in FIG. 1 being in open communication with the upper part of the chute 1 and the lower part of the inlet tube 3, while the upper end of the enclosure forms a suction chamber 6, the latter being connected through a suction conduit 7 to a suction fan or the like (not shown).

In order to prevent the dust, which is transported with the suctioned air from the transition region between the inlet tube 3 and the chute 1, from leaving the filter assembly 2 and thus escaping to the atmosphere through the above-mentioned suction fan, a number of filter bags 9 are placed in the enclosure between the inlet tube 3 and the outer wall 8 of the filter assembly. Quite a large number of these filter bags 9 may be placed about the inlet tube 3, but only two of these are shown in the drawing.

As evident from the drawing, the interior parts of the filter bags 9 are situated on the downstream side of the flow of air being evacuated, for which reason dust coming from the flow of grain will be deposited on the upstream side, i.e. the outside of the filter bags 9.

The chute 1 is made collapsible in a manner known per se, its outer wall 10 being shaped with peripheral folds in such a manner, that it in fact constitutes a folding bellows. In order to protect the outer wall 10 against grain falling through the chute 1, a number of downwardly converging funnel rings 11a–d are secured with intervening spaces to the outer wall 10, said funnel rings constantly urging the grain inwardly in a direction away from the inside of the outer wall 10. In the embodiment shown, the chute 1 comprises only four funnel rings 11a–d, but in practical use, the chute i will have a considerably greater length in relation to its diameter than as shown, and will hence likewise have a greater number of funnel rings, e.g. from eight to ten.

Those features of the device according to the present invention up to now having been described in this detailed portion of the present specification, at least in principle substantially belong to the present state of this art. The new and characteristic features of the device according to the present invention are to be found in the construction of the filter assembly 2, now to be described in a more detailed manner.

In contrast to previous filter assemblies for use in devices of this kind, the filter assembly 2 according to the present invention is in principle telescopic or collapsible in the axial direction, i.e. in the. vertical direction. This is achieved partly by shaping the outer wall 8 of the filter assembly as a folding bellows in the same manner as the outer wall 10 in the chute 1, and partly by likewise shaping and situating the filter bags 9 in such a manner, that they may be collapsed in the axial direction or vertical direction of the device.

This will be clearly evident by comparing FIGS. 1 and 2, the latter Figure showing the device with both the chute 1 and the filter assembly 2 in the collapsed condition. As evident from the drawing, the funnel rings 11a-d of the chute are constructed with such a large internal diameter, that they can be moved up around the lower part of the inlet tube 3 with ample clearance, so that the mutual dimensioning of the inlet tube 3 and the funnel rings does not constitute any hindrance to lifting of the chute 1 to the level remitted by the collapsed filter assembly.

In order to prevent the suction pressure in the suction chamber 6 from causing the filter bags 9 to collapse, the latter may with internal stiffening rings or the like (not shown preventing radial collapse of the filter bags, and partly and in a manner known per se be provided is with internal stiffening rings or the like (not shown) preventing radial collapse of the filter bag, and diagrammatically illustrated at the top of the filter bags 9 in FIGS. 1 and 2 for partly be provided with means to prevent the filter bags from collapsing axially, e.g. in the form of a sufficiently heavy weight 12 placed on or secured to the bottom of each filter bag, or else a securing member 13, with which the bottom of each filter bag is secured to a rigid matching ring 14 inserted between the outer walls 8 and 10.

The drawing shows only those parts strictly necessary for understanding the present invention, other parts being omitted to simplify the drawing.

The device shown normally will comprise, the following illustrated elements a number of hoisting cords with an associated manual or motor-driven winch, by which the outlet cone 4 may be lifted, thus collapsing the complete device, means for removing the collected dust from the outside of the filter bags 9, such as a vibrator, a dust-collecting device etc., and a tapered plug or the like for closing the outlet cone 4 when bulk cargo is not to be delivered through the device.

The present invention is, of course, not limited to the construction of the exemplary embodiment of the invention. Thus, the outer wall 8 of the filter assembly and the outer wall 10 of the chute may be "telescopic", i.e. in the form of a number of tubes or rings, that may be pushed into each other. The filter means may also be constructed otherwise than the bags 9 shown; thus, instead of a number of separate bags two peripheral filter walls may be used, which in a longitudinal sectional view corresponding to FIG. 1 would appear almost in the same manner as the filter bags 9 shown therein. Further, the filter means may—at least in theory—also be "telescopic", i.e. in the form of a number of tubes or rings of air-permeable material capable of being telescoped into each other.

In the exemplary embodiment shown in the drawing, the inlet tube 3 is rigid and not telescopic or collapsible. It is, however, within the scope of the present invention also to construct this component in such a manner (not shown), that it may be collapsed or telescoped in the axial direction in a similar manner to the chute 1 and the filter assembly 2. If so, the funnel rings 11a-d do not necessarily have to have such an internal diameter, that they may be placed around the inlet tube 3.

LIST OF PARTS

| | |
|---|---|
| 1 | chute |
| 2 | filter assembly |
| 3 | inlet tube |
| 4 | outlet cone |
| 5 | roof |
| 6 | suction chamber |
| 7 | suction conduit |
| 8 | outer wall |
| 9 | filter bag |
| 10 | outer wall |
| 11a-d | funnel ring |
| 12 | weight |
| 13 | securing member |
| 14 | matching ring |

What is claimed is:

1. Apparatus for delivering flowable bulk material substantially free of dust, said apparatus comprising:
    a chute having elongated and contracted states in a vertical direction, said chute having an open upper end for supply of flowable bulk material thereto and a lower end with outlet means for delivery of said flowable bulk material, and
    an inlet assembly above said chute, said inlet assembly having an upper inlet end for receiving the flowable bulk material from an outside source and a lower outlet end for delivery of the flowable bulk material to said open upper end of said chute, said inlet assembly having a suction chamber for air flow from the apparatus as the bulk cargo flows through the inlet assembly and the chute,
    said inlet assembly including a filter assembly for filtering dust from the air before the air leaves the apparatus, said filter assembly having elongated and contracted states in the vertical direction.

2. Apparatus as claimed in claim 1, wherein said inlet assembly comprises a substantially vertical inlet tube for receiving the flowable bulk material via said upper inlet end, said inlet tube having a lower outlet end, a filter housing surrounding the vertical inlet tube to form a space communicating the said suction chamber, a suction conduit connected to said suction chamber to convey the suctioned air from the suction chamber, said filter assembly comprising at least one filter means between the outlet end of said inlet tube and said suction chamber for filtering the air flowing to said suction conduit.

3. Apparatus as claimed in claim 2, wherein said filter housing has a lower end connected to said upper end of said chute, said filter housing having elongated and contracted states in the vertical direction, said filter assembly and said filter housing being moved to respective contracted states when said chute is moved to its contracted state.

4. Apparatus as claimed in claim 3, wherein at least said upper end of said chute has an internal transverse dimension greater than that of said lower end of said inlet tube to surround said lower end of said inlet tube with clearance when the chute is in said contracted state.

5. Apparatus as claimed in claim 3, wherein said at least one filter means comprises a filter bag having an open, upwardly facing mouth in communication with said suction chamber.

6. Apparatus as claimed in claim 5, wherein said bag has a lower end including weight means thereat for preventing longitudinal collapse of the bag due to suction pressure produced in the suction chamber.

7. Apparatus as claimed in claim 5, wherein said bag has a lower end connected to the lower end of the filter housing such that the bag is stretched when the filter housing is elongated.

8. Apparatus as claimed in claim 5, wherein said bag has a lower end connected to the upper end of the chute such that the bag is stretched when the filter housing is elongated.

9. Apparatus as claimed in claim 5, wherein said chute comprises a folding bellows and vertically spaced funnel rings internally connected within said bellows, said funnel rings being tapered to direct the flowable bulk material away from said bellows as the material flows through said chute, said filter bag being connected to an uppermost one of said funnel rings.

10. Apparatus as claimed in claim 5, wherein said filter housing and said filter bag are made of collapsible material to enable said filter housing and said filter bag to assume said contracted and elongated states.

* * * * *